United States Patent [19]
Durkin et al.

[11] Patent Number: 5,241,643
[45] Date of Patent: Aug. 31, 1993

[54] MEMORY SYSTEM AND ASSOCIATED METHOD FOR DISABLING ADDRESS BUFFERS CONNECTED TO UNUSED SIMM SLOTS

[75] Inventors: Michael D. Durkin; Greg N. Stewart; Thomas H. Holman, Jr., all of Austin, Tex.

[73] Assignee: Dell USA, L.P., Austin, Tex.

[21] Appl. No.: 540,651

[22] Filed: Jun. 19, 1990

[51] Int. Cl.⁵ .................................. G06F 13/00
[52] U.S. Cl. ...................... 395/425; 395/400; 365/52; 365/230.08; 364/DIG. 1
[58] Field of Search ............ 395/425, 200 MS File, 395/900 MS File, 400; 365/52, 230.03, 230.08, 63; 235/492

[56] References Cited

U.S. PATENT DOCUMENTS

| | | | |
|---|---|---|---|
| 4,303,993 | 12/1981 | Panepinto, Jr. et al. | 365/230.03 |
| 4,545,010 | 10/1985 | Salas et al. | 395/425 |
| 4,562,535 | 12/1985 | Vincent et al. | 395/325 |
| 4,571,676 | 2/1986 | Mantellina et al. | 395/425 |
| 4,701,878 | 10/1987 | Günkel et al. | 395/325 |
| 4,744,025 | 5/1988 | Lipcon et al. | 395/425 |
| 4,787,060 | 11/1988 | Boudreau et al. | 395/425 |
| 5,051,994 | 9/1991 | Bluethman et al. | 371/11.1 |
| 5,070,450 | 12/1991 | Holman, Jr. et al. | 395/750 |
| 5,126,910 | 6/1992 | Windsor et al. | 365/52 |

*Primary Examiner*—Glenn Gossage
*Attorney, Agent, or Firm*—Thomas G. Devine; James W. Huffman

[57] ABSTRACT

A memory circuit for use in a data processing system is accessed by address signals and includes interconnection circuitry for at least one memory module. The memory circuit further includes an address buffer for transmitting the address signals to the interconnection circuits if and only if the at least one memory module is present. A line interconnects the output enable pin of an address buffer to a grounded PRESENT (PRES) pin on a (single in-line memory module (SIMM) when it is installed in a socket. The line to the address buffer enable pin includes a pull-up resistor portion so that the address buffer is disabled unless a SIMM is connected to the socket.

23 Claims, 7 Drawing Sheets

MEMORY SYSTEM AND ASSOCIATED METHOD FOR DISABLING ADDRESS BUFFERS CONNECTED TO UNUSED SIMM SLOTS

CROSS REFERENCE TO RELATED APPLICATIONS

This application is related to the following U.S. patent applications:

| SERIAL NO. | TITLE | INVENTOR | FILING DATE |
|---|---|---|---|
| 490,003 | Method and Apparatus for Performing Multi-Master Bus Pipelining | Zeller, et al | 03/07/90 |
| 540,983 | Error Correction Code Pipeline For Interleaved Memory | Matteson, et al. | 06/19/90 |
| 529,985 | Processor and Cache Controller Interface Lock Jumper | Holman, et al. | 05/25/90 |
| 532,046 (now abandoned) | Multiple DRAM Assemblies Using a Single PCB | Holman | 05/25/90 |
| 532,045 (now U.S. Pat. No. 5,070,450) | Power-On Coordination System and Method For Multi-Processor | Holman, et al. | 05/25/90 |
| 541,103 | Computer System Having A Selectable Cache Subsystem | Holman | 06/19/90 |
| 540,049 | A Digital Computer Having A System For Sequentially Refreshing An Expandable Dynamic RAM Memory Circuit | Matteson, et al. | 06/19/90 |
| 530,137 | Dual Path Memory Retrieval System for an Interleaved Dynamic RAM Memory Unit | Gaskins, et al. | 05/25/90 |
| 516,628 (now abandoned in favor of continuation application Serial No. 08/013,128) | Digital Computer Having an Error Correction Code (ECC) System with Comparator Integrated Into Re-Encoder | Longwell, et al. | 04/30/90 |
| 516,894 (now abandoned in favor of continuation application Serial No. 07/895,253) | Minimized Error Correction Bad Bit Decoder | Longwell, et al. | 04/30/90 |
| 516,606 | Shared Logic Error Correction Syndrome Encoding | Longwell, et al. | 04/30/90 |

The above listed applications are all assigned to the assignee of this invention and are herein incorporated by reference.

BACKGROUND OF THE INVENTION

1. Field of the Invention

The present invention relates to memory systems and, more particularly, to memory systems including memory modules and associated address buffers.

2. Description of Related Art

Digital data processing systems generally comprise a central processing unit (CPU), a main memory and one or more input/output devices such as card readers, magnetic tape readers, magnetic disks and printers, which are interfaced to the CPU and main memory via input/output controllers (IOC). In typical data processing systems, the amount of main memory in the system can usually be varied from some minimal amount to some maximum amount with the user of the data processing system determining the amount of memory to be actually installed within each particular system. Additional quantities of main memory, usually packaged in incremental units, can be added to a system as they are needed. The amount of main installed into a computer system is usually a function of the size and number of computer programs to be executed, the amount of data to be processed, and the speed with which the data must be processed. Therefore, in a typical data processing system, the amount of main memory actually configured within a particular system is less than the maximum amount of memory which could be configured.

Typically, the main memory within a computer is composed of dynamic random-access memory (DRAM) chips. As their name suggests, DRAM chips offer the possibility of calling any data word stored in memory to the CPU independently of its multitudinous neighbors. This is assured because DRAM chips store individual bits of data in multiple rows and columns of cells which provide each data bit with its own unique address. Address buffers are used to receive signals from a memory controller which are indicative of the particular rows and columns of cells within the DRAM chips which are to be accessed by the CPU. The address buffers function as a means for transmitting address signals and actually apply to the memory chips the address signals which are necessary in order to store and retrieve data in the cells of the chips.

Around 1983, Wang Laboratories (Lowell, Mass.) announced development of a method of packaging DRAMs that significantly reduced cost and space requirements of computer memory. The product of development was a single in-line memory module or SIMM that integrated nine separate 64 K RAM chips into a 0.75 × 3-inch space. SIMMs which are essentially small printed circuit (PC) boards with arrays of memory chips contained in plastic leaded chip carriers surface mounted on one or both sides of the boards, have evolved so that they now typically hold either nine 1 M-bit DRAMs or nine 256K-bit DRAMs. SIMMs are generally installed in connector sockets to make them easily added to a system and avoid the difficulty and risks of soldering the SIMMs directly to a PC board.

It should be appreciated that in the computer arts efforts are made to keep the number of components to a minimum, but to use each component to the fullest extent possible in order to optimize the compactness and efficiency of each system. In computer memory packaging, each DRAM SIMM could have its own individually associated address buffer, however, a single address buffer has often been employed to drive two DRAM SIMMs. As computer systems frequently include more than one pair of DRAM SIMMs, it is common to have a multiple of pairs of DRAM SIMMs mounted in slots or sockets with each pair of SIMMs having a single address buffer associated with in As discussed above, computer memories are generally configured with less than the maximum amount of memory possible being actually installed in the system. Such systems are most efficiently made by initially equipping them with a full complement of address buffers and SIMM sockets for mounting memory components but only installing the number of memory components which are initially needed in the system, as selected by the user. Thus, it is likely that less than all of the SIMM sockets of a new system will have memory components actually installed in them. Adding memory later as it is needed can be quickly and easily accomplished by simply putting a memory component, e.g., a SIMM, into an empty socket since the address buffer is already present in the system to access that newly added memory.

Notwithstanding the clear efficiencies and desirable attributes of designs such as those mentioned above, such designs have had a number of deficiencies and shortcomings. For example, in order to ensure that the address buffers are capable of immediately driving a memory module newly installed in a socket, those address buffers must be kept in a constantly enabled state. While constantly enabling the address buffers for all SIMM sockets guarantees their ability to drive address lines (i.e., column and row information going to DRAMs), if a SIMM is not installed, the address buffer still drives address lines. Unnecessary voltage output signals from address buffers are a source of both excess current draw and electrical noise within the system. Excess current draw is undesirable because system power consumption is increase and noise, in the form of electromagnetic interference (EM) caused by rapid switching of address buffer signals, is undesirable because it can produce data errors.

Other systems have addressed these problems by enabling address buffers by means of manually operated DIP (dual in-line package) switches or jumpers used to configure system memory. However, reliance upon a user to manually, and correctly, activate switches or install jumpers is not a reliable solution in a complex computer memory system.

Based on the foregoing, it should be appreciated that there are good reasons for keeping an address buffer associated with a memory module constantly enabled; however, shortcomings and deficiencies are associated with such a design. The preferred prior art solutions to these problems have proven to be inadequate.

SUMMARY OF THE INVENTION

The present invention overcomes the shortcomings and deficiencies of the prior art by providing a memory circuit including interconnection means adapted for receiving a memory module, detecting means for electrically detecting a presence of the memory module within the interconnection means, and transmitting means for transmitting address signals to the interconnection means only when the detecting means detects a presence of a memory module within the interconnection means.

Certain embodiments of the present invention may also include at least one address buffer connected between a central processing unit and the memory module interconnection means and the interconnection means may include a socket into which the at least one memory module may be installed. In other aspects of the present invention, the memory circuit includes means for disabling the at least one address buffer if a memory module is not installed in the socket.

In other embodiments of the present invention, there may be at least two sockets for DRAM SIMMs, the at least two sockets being driven by a single address buffer. In such an embodiment, a line having a pull-up resistor portion interconnects an output enable pin on the single address buffer and grounded PRESENT (PRES) pins on each DRAM SIMM installed in the at least two sockets. Further, in such an embodiment, absence of both DRAM SIMMs would, because of the pull-up resistor, disable the address buffer by driving the output enable line high. On the other hand, presence of one or both of the DRAM SIMMs would drive the output enable line low, enabling the address buffer.

A method according to the teachings of the present invention includes the steps of passing address signals to a connector for receiving a memory module using disable-able address buffering means, and disabling the buffering means if a memory module, to which the address signals are being sent, is not present.

Accordingly, it is an object of the present invention to disable address buffers associated with optional memory modules, when those optional memory modules are not present.

Another object of the present invention is to avoid the driving of address lines with no loads being present on those lines, which driving causes the drawing of excess current and the generation of excess electrical noise, both of which are undesirable circuit characteristics in a computer memory system.

BRIEF DESCRIPTION OF THE DRAWINGS

For a more complete understanding of the present invention, and for further objects and advantages thereof, reference may now be had to the following description taken in conjunction with the accompanying drawings in which.

DETAILED DESCRIPTION OF THE INVENTION

Figure 1A:
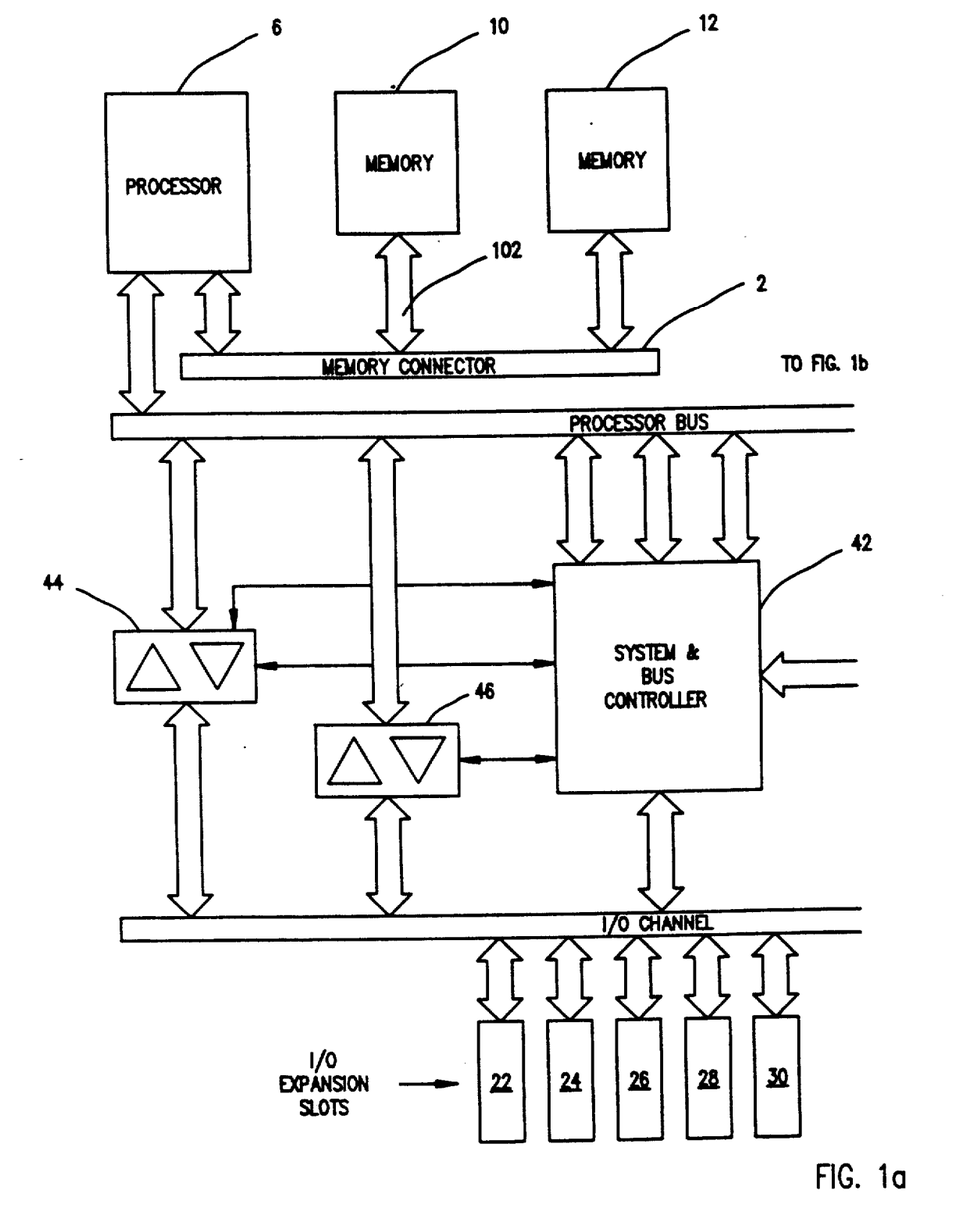
FIG. 1a and 1b depict a block diagram of a computer system which employs the memory configuration of the present invention.
Figure 1B:
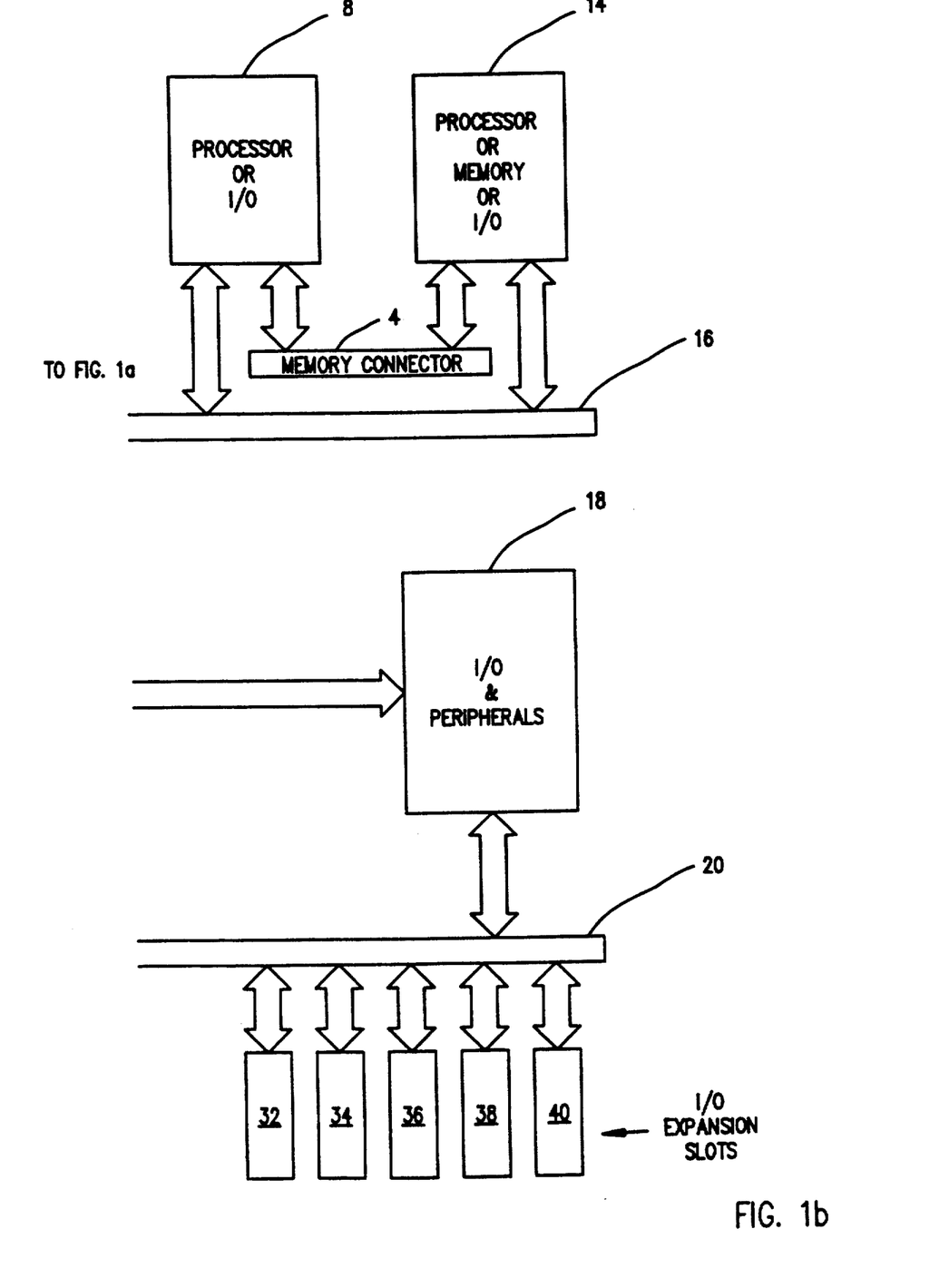

Referring now to the drawings wherein like reference numerals designate identical or similar elements throughout the several views, depicted in FIG. 1a and 1b is a general high level block diagram of a computer system. The system of the present invention will initially be considered at this level, and at a number of successive, detailed levels, to ensure a full understanding and appreciation of the role and operation of the present invention in an environment in which it could be usefully employed.

FIG. 1a and 1b show a personal computer system employing the system of the present invention and illustrates four main buses which represent the major interface between the various components at the top level. A first memory connector 2 and a second memory connector 4 comprise private interfaces between processors 6, 8 and their respective dedicated memories, 10, 12 and 14. Memory 15 may optionally be a processor or an intelligent I/O. A processor bus 16 is the multiple master bus which is the architectural break between the processing units, which include processors 6 and 8, and an I/O channel 20 comprising a standard interface which may be either Industry Standard Architecture (ISA), Extended Industry Standard Architecture (EISA) or microchannel.

The process bus 16 performs various functions. First, it serves as an interconnection among the processors 6 and 8, and the intelligent I/O, and/or optional processor 14; all system memory 10, 12 and optional memory 14; and the system I/O channel 20 and its I/O expansion slots 22-40. System memory 10, 12 and 14 may be configured as a virtual 64 bit interleaved memory with two associated banks for storage of one 32 bit double word each, one odd and one even. Thus, the processor bus 16 allows each processor 6, 8 to access another processor's 8, 6 memory. This access is allowed "through" the processor that is directly connected to the memory. That is, when a processor connected to the processor bus 16 requests access to a location in some other processor's memory, the other processor completes the access locally, receiving the address from the processor bus 16 and transferring the data to and from the processor bus 16. Additionally, the processor bus 16 serves as a communication link between processors 6, 8 and 14. Through inter-processor communication mechanisms (the details of which are not critical to the present invention and, for that reason, are not set forth herein), each processor can address and interrupt each other processor.

In addition to the foregoing, the processor bus 16 also acts as the interface between the processor memory complexes 10, 12, and 14 and the I/O channel 20. Addresses and data are transferred under control of a system and bus controller 42 between the processor bus 16 and the I/O channel 20 through a set of transceivers 44 and 46 which may comprise Model 74ALS245 transceivers made by Texas Instruments Incorporated. Through this interface, a processor bus master can access the system I/O and peripherals 18 as well as each of the I/O expansion slots 22, 24, 26, 28, 30, 32, 34, 36, 38, 40. Still further, the processor bus 16 also acts as the data communications path for I/O to I/O accesses. The system and bus controller 42 generates "action codes" which format the protocols necessary for inter-device communication and thereby enable intelligent cards of wide diversity to be plugged into an I/O expansion slot and access other I/O cards or even the processors and memory connected to the processor bus 16.

The system and bus controller 42, in addition to providing routing information and action code generation, handles all processor bus 16 arbitration and interfaces all control signals to the system I/O and peripherals 18, such as ISA "commands" direct memory access (DMA) control lights, and interrupts.

Figure 2:
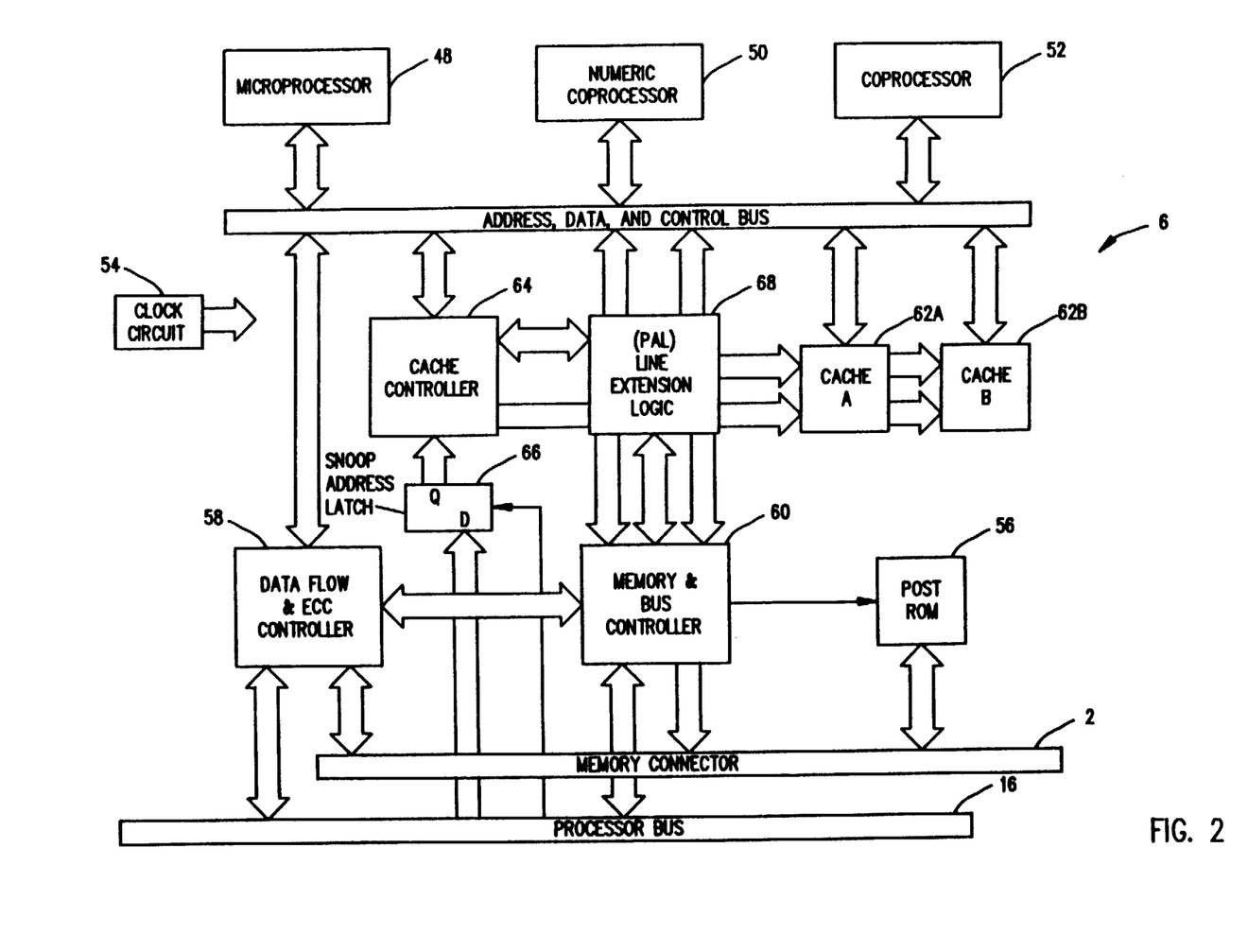
FIG. 2 is a block diagram of a processor module used in the computer system of FIG. 1.

Referring now to FIG. 2, there is shown a block diagram of the major components of a processor card employed in the computer system of FIG. 1a and 1b. With reference to FIG. 1a and 1b the processor module 6 can be seen to interface with the rest of the computer system through the memory connector 2 and the processor bus 16.

Processor module 6 includes a microprocessor 48 (e.g., an Intel 80386), a numeric coprocessor 50 (e.g., an Intel 80387), an optional coprocessor 52 (e.g., a Weitek 3167), a cache subsystem, a clock circuit 54, a POST ROM (Power On, Self Test, Read Only Memory) 56, data flow and error correcting circuit (ECC) controller 58, and a memory and bus controller 60.

The cache subsystem includes a cache memory (shown as consisting of two separate banks 62A, 62B of static random access memories (SRAMs) and a cache controller 64 (e.g., an Intel 82385). As should be understood by those skilled in the art, the cache subsystem functions as an extremely fast, "sketchpad-like" memory or "scratchpad" memory, which provides rapid access to the data most frequently needed by the processor. The system may employ cache memory with cache line sizes of 4 double words each so that if a cacheable read is made by the processor, the memory controller returns 4 sequential double words into the cache from system memory. Optimizing the accuracy with which this operation occurs from a pair of interleaved 32 bit, double word memory banks and through error correction and/or detection circuitry is one of the principal goals of the system of the present invention, as discussed below.

For systems with a cache 62A, 62B, a snoop address latch 66 would likely be included to capture each processor address that is generated in order to invalidate address if necessary. Additionally, in systems with a cache memory, a programmable array logic (PAL) line extension logic 68 would likely also be included to control address and control signals passing between the cache 62A, 62B, cache controller 64, and memory and bus controller 60.

The processor module 6 also includes local address, data and control buses (indicated by the various arrows shown in FIG. 2) that intercoms the microprocessor 48, coprocessor 50, 62 and cache 62A, 62B, as well as the data flow and ECC controller 58 and memory and bus controller 60. These buses are used for local cycles such as ROM 56 reads, coprocessor cycles and cache read hits. Access to the ROM 56 can be accomplished via operation of the data flow and ECC controller 58 and memory and bus controller 60. For global cycles such as cache writes, cache read misses, non-cacheable cycles, and I/O cycles, however, the processor module 6 must complete its access of-board.

For off-board cycles, the memory and bus controller 60 decodes the local address and control signal and determines whether the access is destined for the processor bus 16 or for the dedicated memory. For a memory cycle, the memory and bus controller 60 generates the memory control signals (i.e. row address strobe (RAS), column address strobe (CAS) and write enable (WE) and addresses to access the memory card. The memory and bus controller 60 also generates refresh signal so the memory card, e.g., element 10 (FIG. 1a) for each refresh period. In conjunction with the memory bus controller 60, the data flow and ECC controller 58 also performs error checking and correction.

For off-board cycles that are not destined for the memory card 10, the memory and bus controller 60 generates a processor bus request signal and takes control of the processor bus 16 when it is granted. Again, working in conjunction with the data flow and ECC controller 58, the memory and bus controller 60 completes the access to the processor bus 16.

Figure 3:
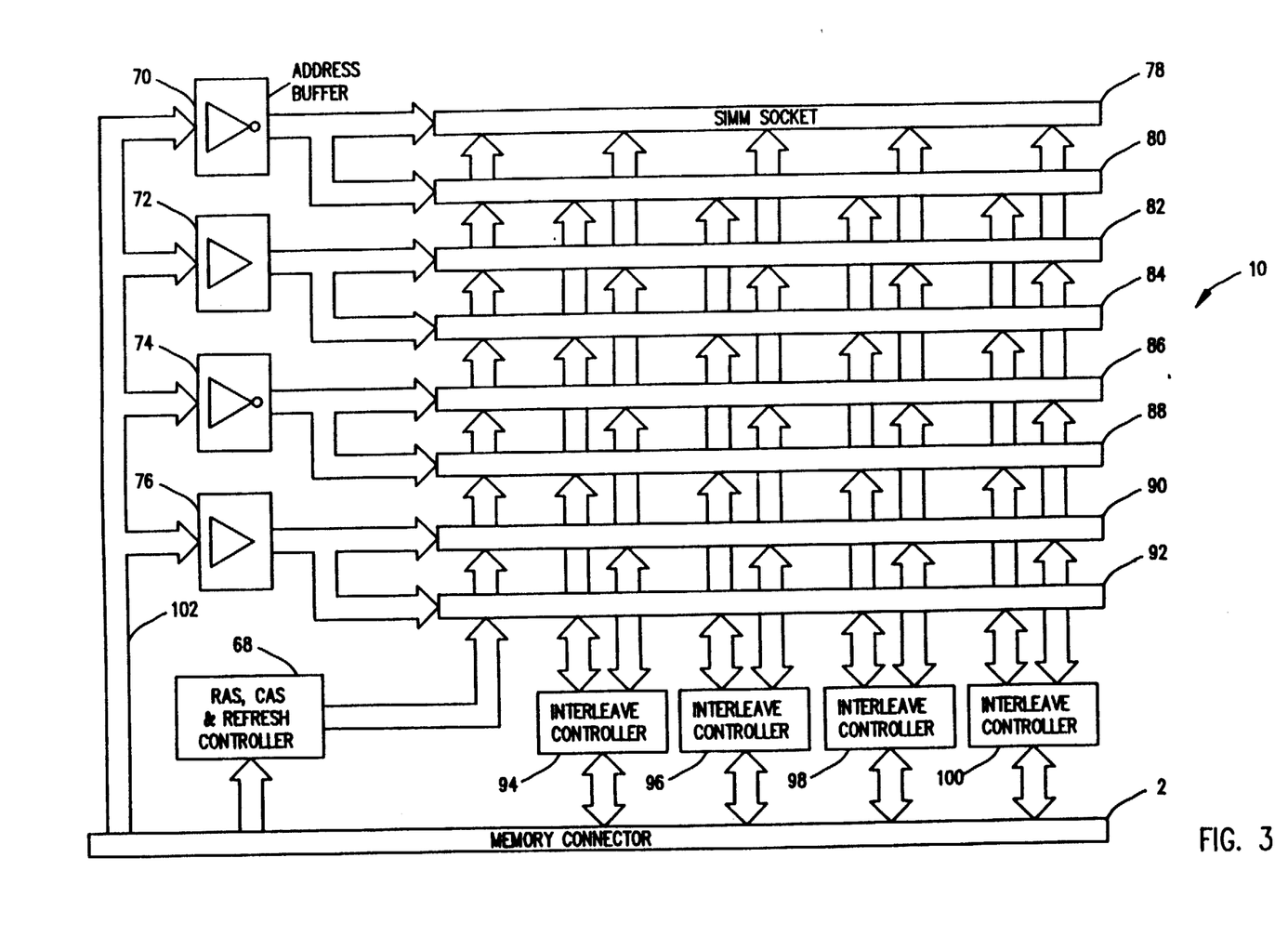
FIG. 3 is a block diagram of a memory module employed in the computer system of FIG. 1.

Referring now to FIG. 3 a block diagram of the major components of a memory card 10 is set forth therein. With reference to FIG. 1a, the memory card 10 interfaces to the rest of the system through the memory conductor 2.

As discussed, each memory card 10 preferably implements storage of virtual 64 bit words in the form of 2 interleaved banks of 32 bit double words, one odd and one even. Each card 10 includes a RAS, CAS, and refresh controller 68, four address buffers 70, 72, 74, 76 eight signal in-line memory (SIMM) slots 78, 80, 82, 84, 86, 88, 90, 92, and four interleave controllers 94, 96, 98, 100. The RAS, CAS, and refresh controller 68 receives control signals from the memory interface 102 which is driven by the memory and bus controller 60 (see FIG. 2), and then, in turn drives the control signals to the SIMM slots 68, 80, 82, 84, 86, 88, 90, 92 for reads, writes and refreshes. Each of the four interleave controllers 94, 96, 98, 100 multiplexes eight bits of data between the memory connector 2 and the SIMM slots 78, 80, 82, 84, 86, 88, 90, 92.

As previously mentioned, each memory card 10 and 12 includes address buffers 70, 72 74, 76 and SIMM slots or sockets 78, 80, 82, 84, 86, 88, 90, 92. By way of example only, Model 74FCT828 and 74FCT827 data buffers manufactured by VTC Inc. in Bloomington, Minn. could be used as the address buffers 70, 72, 74, 76. Inverting (74FCT828's) and non-inverting (74FCT827's) buffers are used to minimize the average address line signal switching to minimize electrical noise. The SIMM slots 78, 80, 82, 84, 86, 88, 90, 92 can be adapted to accommodate either 1, 2, 4 or 8 Mbyte SIMMs with either parity or ECC organization. The address buffers 70, 72, 74, 76 and the SIMM slots 78, 80, 82, 84, 86, 88, 90, 92 play important roles in the system and method of the present invention and thus discussed in detail below. Output enable pins 104, 106, 108, shown in FIG. 4, are not illustrated in FIG. 3.

Figure 4:
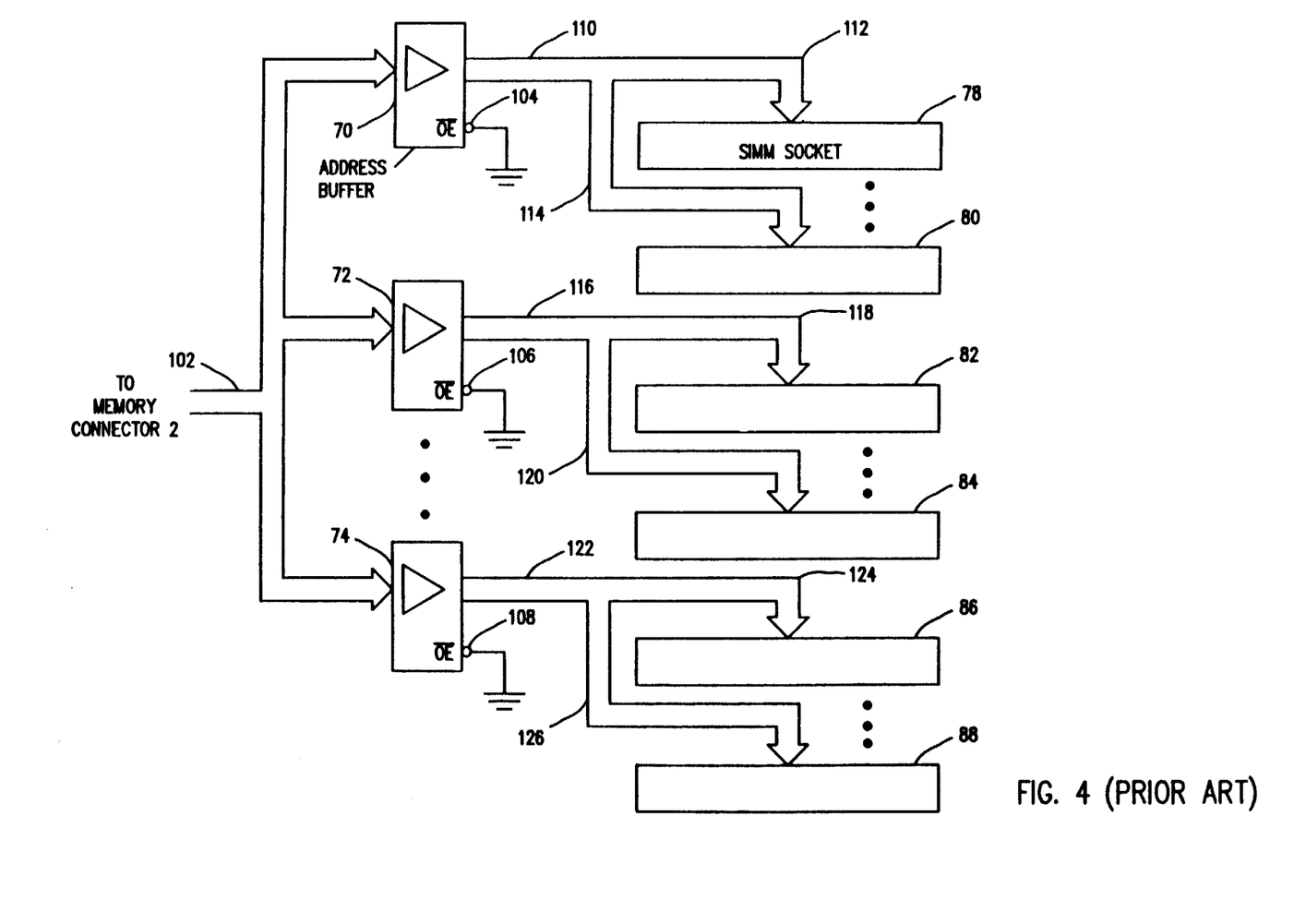
FIG. 4 is a block diagram of a prior art memory circuit.

Referring now to FIG. 4, a block diagram of a prior art memory circuit is shown therein. In general, this circuit corresponds to what could be a portion of FIG. 3. More specifically, that portion could include, for example, address buffers 70, 72, 74 and corresponding SIMM sockets 78, 80, 82, 84, 86, 88. While pairs of SIMM sockets are shown associated with each single buffer, e.g., sockets 78, 80 with buffer 70, any number of SIMM sockets could be associated with each buffer.

In the prior art configuration of FIG. 4, it should be appreciated that address data travels through line 102, from memory connector 2 as can be seen in FIG. 3, and is collected in the various address buffers 70, 72, 74. As previously mentioned, either inverting or noninverting buffers 74FCT828's and 74FCT827's, respectively, both manufactured by VTC, could be employed for such buffers. As is well known to those skilled in the art, address buffers of this type have an output enable ($\overline{OE}$) pin 104, 106, 108. When an output enable pin, e.g., pin 104 of buffer 70, is low, the buffer is in an enabled state. When, on the other hand, the output enable pin 104 is high, the associated buffer 70 is disabled.

After being buffered in the address buffer 70, the address data passes through, lines 110, 112 and 114 respectively, to SIMM sockets 78, 80 into which SIMMs could be installed. Signals from the address buffers 70-74 drive the address lines of the DRAM memory chips mounted in the SIMMs plugged into the sockets 78-88 in order to access the memory.

As mentioned above in the description of related art section, it is not uncommon in commercially shipped computer systems for a number of SIMM memory sockets not to have SIMMs installed therein. This is because computer systems are frequently sold with less than the maximum possible memory being actually installed. Such systems provide for quick and easy memory expansion and upgrading in the form of empty slots, ready to accept a memory module. For purposes of illustration of the system of the present invention, the configuration of FIG. 4 may be considered to have three SIMMs installed in the six available SIMM sockets, for example, in slots 78, 80 and 82.

It can be seen in FIG. 4 illustrating the prior art, the output enable pins 104, 106, 108 of buffers 70, 72, 74 are grounded. Hence, the voltage levels of the output enable pins are low, and the various buffers 70, 72 and 74 are constantly enabled. Thus, address data is constantly driven into SIMM slots 78, 80, 82, 84, 86 and 88 regardless of whether a SIMM is installed in any particular one or more of these slots. In the prior art configuration of FIG. 4, the fact that slot pair 86 and 88 has no associated SIMMs and that slot pair 82 and 84 has only associated SIMM (in slot 82) is irrelevant and all SIMM slots, including empty slots 84, 86 and 88 are driven. As discussed above, this causes unnecessarily high current draw and circuit noise, both of which are extremely undesirable circuit characteristics in a memory system.

Figure 5:
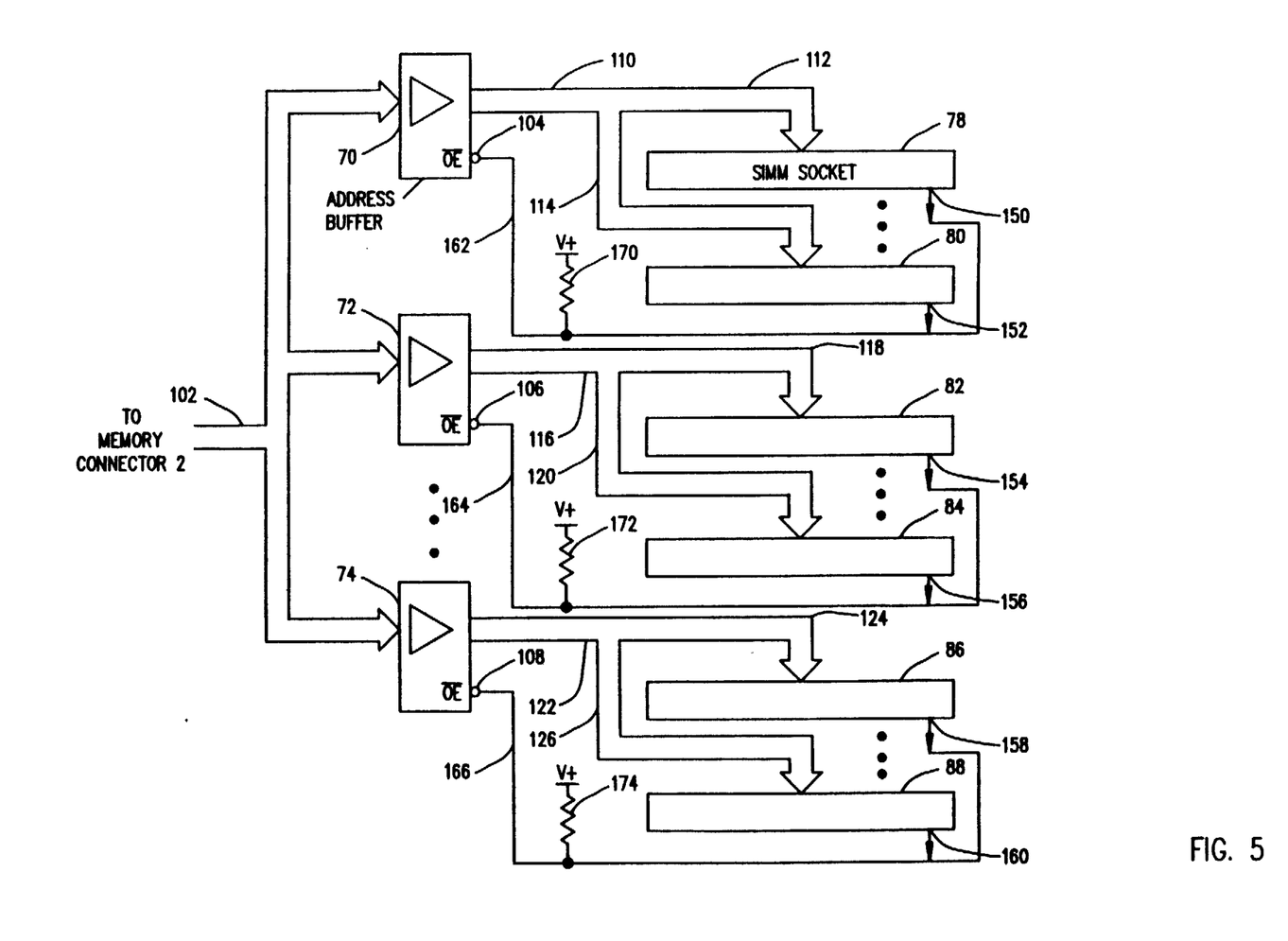
FIG. 5 is a block diagram of a memory circuit according to the teachings of the present invention.

Referring now to FIG. 5 there is shown a circuit similar to the one shown in FIG. 4, although it has been modified according to the teachings of the present invention. The memory circuit of FIG. 5 includes line 102; address buffers 70, 72, 74 with output enable pins 104, 106, 108; SIMM sockets of slots 78, 80, 82, 84, 86, 88; and address data lines 110, 112, 114, 116, 118, 120, 122, 124, 126, interconnecting certain of the buffers 70, 72, 74 and certain of the SIMM sockets 78, 80, 82, 84, 86, 88. Each of these elements of the memory circuit are common to both the prior art configuration shown in FIG. 4 and the configuration constructed according to the system of the present invention shown in FIG. 5.

Figure 6:
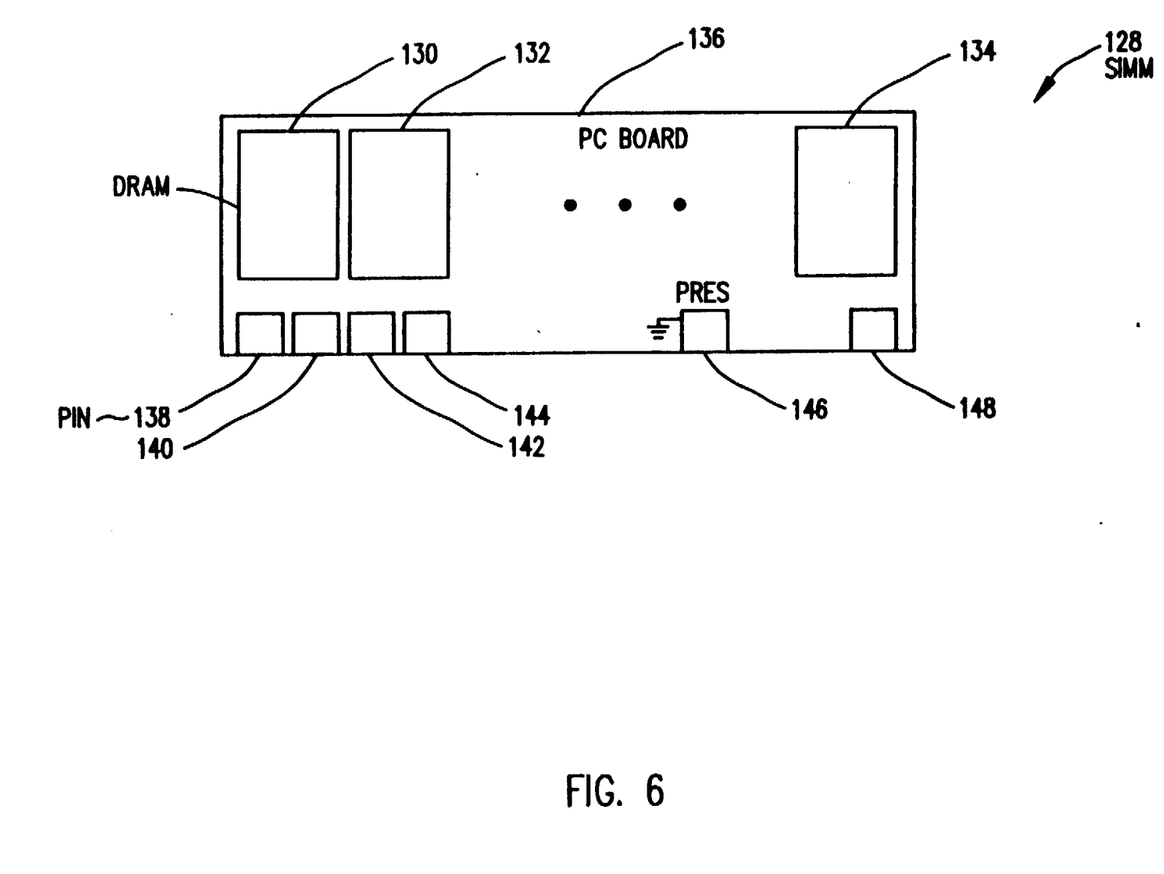
FIG. 6 is a schematic view of a DRAM SIMM modified for use in a memory circuit according to the present invention.

Referring briefly to FIG. 6, there is shown, in partial schematic form, a SIMM 128. SIMM 128 comprises a plurality of DRAMS 130, 132 . . . 134 mounted on a small rectangular printed circuit board 136, with a plurality of pins; e.g., pins 138, 140, 142, including a PRES pin 146. According to one aspect of the teachings of the present invention, PRES pin 146 of SIMM 128 is grounded on the printed circuit board of SIMM 128.

Referring again to FIG. 5, modified SIMMs 128, as shown and discussed above in connection with FIG. 6, can be installed in each of the various SIMM sockets 78, 80, 82, 84, 86, 88. For purposes of illustration, it will be considered that modified SIMMs 128 are installed only in sockets 78, 80 and 82 and sockets 84, 86, and 88 remain empty.

Comparing FIG. 5 to FIG. 4, it may be seen that the configuration of FIG. 5 differs form FIG. 4 in that, rather than being grounded, the output enable pins 104, 106, 108 of the various address buffers 78, 80, 82, 84, 86, 88. According to the teachings of the present invention these points 150, 152, 154, 156, 158, 160 are positioned to contact the grounded PRES pin (e.g., pin 146) of SIMMs 128 installed in the various sockets 78, 80, 82, 84, 86, 88. Also according to the teachings of the present invention, the lines 162, 164, 166, interconnecting pins 104, 106, 108 and points 150, 152, 154, 156, 158, 160 have pull-up resistors 170, 172, 174 connected thereto.

With the configuration shown in FIG. 5, if SIMMs 128 are installed in both sockets of a pair of SIMM sockets 78 and 80 the associated output enable pin 104 would be driven low and the associated address buffer 70 will be enabled, in which case address signals will be forwarded through buffer 70 to SIMMs 128 installed in sockets 78, 80. If, on the other hand, no SIMM is installed in either socket of a pair of sockets, e.g., in neither socket 86 nor 88, line 166 and pull-up resistor 174 will operate to drive the output enable of address buffer 74 high, which will disable it from producing output signals. Thus, address buffer 74 will not needlessly attempt to drive absent SIMMs with address signals — which go nowhere. Finally, if a SIMM is installed in only one socket of a pair, e.g., only in socket 82 of socket pair 82 and 84, the address 72 will be enabled and the installed SIMM 128 will be properly driven. Thus it can be seen that lines 162, 164, 166 and points 150, 152, 154, 156, 158, 160 serve as a detecting circuit for electrically detecting the presence of the SIMM modules within the SIMM sockets. The pull-up resistors 170, 172, 174 act in conjunction with the lines 162, 164, 166 as a disabling circuit for disabling the address buffers when the presence of the SIMM modules is not detected.

Based upon the foregoing, it should be appreciated that the present invention provides a relatively simple and inexpensive system and method for properly driving address data to memory modules if those modules are present, but the driving of empty sockets with unterminated address signals is substantially reduced. This reduction in needless driving signals reduces current draw and circuit noise and improves overall system performance.

Obviously, numerous modifications and variations are possible in view of the above teachings. For example, each SIMM socket could have its own address buffer. If such a system included the lines and pull-up resistors of the present invention even more unnecessary current drawn and noise could be eliminated. Of course, there is a cost/efficiency tradeoff in selecting the number of address buffers and SIMM sockets to be employed in a system. In any event, the present invention will improve system performance in every case in which all of a number of sockets associated with a particular address buffer are empty. Many other modifications and variations are possible. Accordingly, within the scope of the appended claims, the invention may be practiced otherwise as specifically described herein.

What is claimed is:

1. A memory circuit for use in a data processing system and which is accessed by address signals, said memory circuit comprising:

interconnection means adapted for receiving a memory module;

detecting means for electrically detecting a presence of said memory module within said interconnection means; and transmitting means for transmitting said address signals to said interconnection means only when the presence of said memory module within said interconnection means is electrically detected by said detecting means, said transmitting means coupled to said detecting means.

2. A memory circuit as set forth in claim 1 further comprising means for disabling said transmitting means from transmitting said address signals when the presence of said memory module is not detected, said disabling means coupled to said detecting means.

3. A memory circuit as set forth in claim 1, wherein said transmitting means comprises an address buffer connected to transmit said address signals to said interconnection means.

4. A memory circuit as set forth in claim 3, wherein said interconnection means comprises a socket into which said memory module may be installed.

5. A memory circuit as set forth in claim 3, wherein said interconnection means comprises a socket into which said memory modules may be installed and wherein said socket is driven by said address buffer.

6. A memory circuit as set forth in claim 5, wherein said socket is adapted to receive a single in-line memory modules (SIMM) and interconnect said SIMM into said memory circuit.

7. A memory circuit as set forth in claim 6, wherein said SIMM module interconnected into said memory circuit includes a plurality of dynamic random access memory (DRAM) chips.

8. A memory circuit as set forth in claim 7, wherein said SIMM module interconnected into said memory circuit installed in said socket has a grounded PRESENT (PRES) pin connected to said detecting means.

9. A memory circuit as set forth in claim 8, wherein said address buffer includes an output enable pin.

10. A memory circuit as set forth in claim 9, further comprising disabling means for disabling said address buffer when the presence of said SIMM module is not detected by said detecting means, said disabling means comprising a line interconnecting said output enable pin of said address buffer to a pull-up resistor.

11. A computer system comprising:

a processor;

a memory connected to said processor; and a memory controller connected to said memory wherein said memory comprises:

interconnection means adapted for receiving a memory module;

detecting means for electrically detecting a presence of said memory module within said interconnection means; and transmitting means for transmitting address signals to said interconnection means only when the presence of said memory module within said interconnection means is electrically detected by said detecting means, said transmitting means coupled to said detecting means.

12. A computer system as set forth in claim 11 further comprising means for disabling said transmitting means from transmitting said address signals when the presence of said memory module is not detected, said disabling means coupled to said detecting means.

13. A computer system as set forth in claim 11, wherein said transmitting means comprises an address buffer connected to transmit said address signals to said interconnection means.

14. A computer system as set forth in claim 13, wherein said interconnection means comprises a socket into which said memory module may be installed.

15. A computer system as set forth in claim 13, wherein said interconnection means comprises a socket into which said memory module may be installed and wherein said socket is driven by said address buffer.

16. A computer system as set forth in claim 15, wherein said socket is adapted to receive a single in-line memory (SIMM) module and interconnect said SIMM module into said memory circuit.

17. A computer system as set forth in claim 16, wherein said SIMM module interconnected into said memory circuit includes a plurality of to disable said address buffer chips.

18. A computer system as set forth in claim 17, wherein said SIMM module interconnected into said memory circuit installed in said socket has a grounded PRESENT (PRES) pin connected to said detecting means.

19. A computer system as set forth in claim 18, wherein said address buffer includes an output enable pin.

20. A computer system as set forth in claim 19 further comprising disabling means for disabling said address buffer when the presence of said SIMM module is not detected by said detecting means, said disabling means comprising a line interconnecting said output enable pin of said address buffer to a pull-up resistor.

21. A computer system as set forth in claim 20, wherein said memory further comprises a row address strobe, column address strobe (CAS) and refresh controller means connected to said interconnection means.

22. A method for disabling an address buffer within a memory circuit having an interconnection means adapted for receiving a memory module which is accessed by address signals transmitted from said address buffer, said method comprising the steps of:
   buffering said address signals in said address buffer;
   electrically detecting for a presence of said memory module within said interconnection means; and
   disabling said address buffer when said presence of the memory module within said interconnection means is not detected.

23. A method as set forth in claim 22, wherein said step of disabling said address buffer further comprises a step of driving an output enable pin of said address buffer high to disable said address buffer when the presence of said memory module within said interconnection means is not detected.

* * * * *